US008262522B2

(12) United States Patent
Dieudonne et al.

(10) Patent No.: US 8,262,522 B2
(45) Date of Patent: Sep. 11, 2012

(54) POWER TRANSMISSION BELT

(75) Inventors: Marie Dieudonne, Saint Maurice sur Aveyron (FR); Philippe Sonntag, Hericy (FR); Hervé Varin, Joue-les-Tours (FR)

(73) Assignee: Hutchinson, Paris (FR)

( * ) Notice: Subject to any disclaimer, the term of this patent is extended or adjusted under 35 U.S.C. 154(b) by 215 days.

(21) Appl. No.: 11/576,737

(22) PCT Filed: Mar. 1, 2007

(86) PCT No.: PCT/FR2007/000368
§ 371 (c)(1),
(2), (4) Date: Aug. 21, 2007

(87) PCT Pub. No.: WO2007/099233
PCT Pub. Date: Sep. 7, 2007

(65) Prior Publication Data
US 2008/0207371 A1 Aug. 28, 2008

(30) Foreign Application Priority Data
Mar. 3, 2006 (FR) ...................................... 06 01923

(51) Int. Cl.
*F16G 5/00* (2006.01)
(52) U.S. Cl. .................. 474/265; 474/205; 474/264
(58) Field of Classification Search ............ 474/143, 474/205, 260–264, 265
See application file for complete search history.

(56) References Cited

U.S. PATENT DOCUMENTS

| | | | |
|---|---|---|---|
| 3,964,328 A | 6/1976 | Redmond | |
| 4,392,842 A | 7/1983 | Skura et al. | |
| 6,433,089 B1 * | 8/2002 | Nishihara et al. | 525/191 |
| 6,443,866 B1 * | 9/2002 | Billups | 474/260 |
| 6,739,997 B2 * | 5/2004 | Di Meco et al. | 474/260 |
| 2004/0018906 A1 * | 1/2004 | Sedlacek | 474/260 |
| 2004/0214675 A1 | 10/2004 | Beck | |
| 2005/0093205 A1 * | 5/2005 | Martin et al. | 264/326 |

FOREIGN PATENT DOCUMENTS

| | | |
|---|---|---|
| EP | 1154171 A1 * | 11/2001 |
| EP | 1696150 A1 * | 8/2006 |
| FR | 2 210 251 | 7/1974 |
| JP | 2002321228 | * 11/2002 |
| WO | WO 02/084144 | 10/2002 |
| WO | WO 2004/011822 | 2/2004 |

OTHER PUBLICATIONS

Search Report for French Priority Appl. No. 06/01923 filed Mar. 3, 2006.

* cited by examiner

*Primary Examiner* — Robert A Siconolfi
*Assistant Examiner* — Vu Q Nguyen
(74) *Attorney, Agent, or Firm* — Alston & Bird LLP

(57) ABSTRACT

The invention relates to a ribbed power transmission belt exhibiting a toothing made of elastomer based on ethylene/α-olefin elastomer, characterized in that at least the sides of the toothing are coated with a film made of at least partially crosslinked thermoplastic comprising at least 30% of at least one low-density polyethylene having a molecular weight of between 50 000 and 200 000 g/mol.

The invention also relates to a manufacturing process which makes use of the application of a said thermoplastic film in the noncrosslinked or at least partially crosslinked state.

18 Claims, 2 Drawing Sheets

POWER TRANSMISSION BELT

FIELD AND BACKGROUND OF THE INVENTION

The present invention relates to a power transmission belt, namely a V-belt or V-ribbed belt, in particular of K type, for motor vehicle applications.

The ribs of such belts, which are composed of vulcanized rubber, have faces in direct contact with the crankshaft pulley and with the pulleys of the driven accessories.

Internal combustion engines exhibit a phenomenon of cyclic disturbance which becomes more pronounced as the compression ratio increases (in particular in diesel engines) and as the number of cylinders is reduced. This cyclic disturbance imposes significant mechanical stresses on the belts.

Some accessories, for example a charging alternator, exhibit high inertias, which generates levels of dynamic torques which increase in significance as the cyclic disturbance increases. These variations in the level of torque are reflected in their turn by large, indeed even very large, differences in tension of the belt.

When the level of tension of the belt is too low, it can exhibit momentary sliding which is sufficiently great to prevent driving and to generate noise.

The belt must thus exhibit a coefficient of friction sufficient to prevent this phenomenon.

On the other hand, if the coefficient of friction of the belt is too high, a phenomenon of significant sticking in the receiving pulley, followed by sudden slipping, which generates noise (stick-slip), may be observed.

A third possible cause of noisiness is the relative misalignment of two pulleys, which also generates a noise-generating stick-slip phenomenon which increases in significance as the coefficient of friction increases. This phenomenon also depends on the span length, on the dimensions of the belt and on the nature of the materials of which it is composed.

It is known, in order to find a solution for the first two causes (excessively low or excessively high coefficient of friction), to reduce the variations in tension by the addition of devices, such as a damper on the crankshaft (AVT) or else of a free wheel or of a decoupler pulley on the alternator.

It is also possible to increase the mean level of tension of the belt but this solution only partially solves the problem.

Finally, these solutions do not make it possible at all to put right a very great misalignment and to solve the noise phenomenon which is related to it.

It is therefore desirable to find a satisfactory solution for controlling the adhesion between the belts and the pulleys and which, if possible, avoids the addition of auxiliary devices, such as a damper on the crankshaft or else a free wheel or a decoupler pulley on the alternator.

Provision has been made, in French patent application FR 2 210 251, to limit the contact noise by depositing, on the toothing of a belt, a film of ultra-high molecular weight polyethylene or else by depositing a film of polyethylene only on the top of the toothing (PCT application WO 2004/011822), in order to prevent inadequate power transmission due to an excessively low coefficient of friction.

In both cases, shear and bending/reverse bending stresses are undergone by the continuous film, which results in damage to the film by cracking and splitting and thus in an inadequate lifetime of the coating.

Furthermore, provision has been made to incorporate, in the toothing, materials in the form of fillers, for example graphite in the case of patents U.S. Pat. No. 4,024,773, U.S. Pat. No. 4,031,768 or else U.S. Pat. No. 4,892,510.

These fillers are incorporated without sufficient bonding with the polymer of the toothing, which means that, during contact with sliding, filler components are torn off and the rubber/filler rubbing is interrupted. The result of these fillers being torn off is that the initiation of splitting is facilitated and the elastomer is locally weakened.

Thus, the materials deposited at the surface provided do not have an adhesion which is sufficiently strong to guarantee a coefficient of friction which is sufficiently stable during the lifetime of the belt. Because of abrasion, the coefficient of friction gradually increases, resulting in the gradual appearance of a phenomenon of noisiness.

It is an object of the present invention to provide a belt, the performance of which is improved as regards the phenomenon of noisiness.

SUMMARY OF THE INVENTION

The invention thus relates to a ribbed power transmission belt exhibiting a toothing made of elastomer based on ethylene/α-olefin, in particular EPDM or EPM, characterized in that at least the sides of the toothing are at least partially coated with a film made of a thermoplastic at least partially crosslinked and comprising at least 30% of at least one low-density polyethylene, for example 30% and 90% of low-density polyethylene, in particular between 50% and 90% of low-density polyethylene and more particularly between 80% and 90% of low-density polyethylene.

Low-density polyethylene has a molecular weight between 50 000 g/mol and 200 000 g/mol, more particularly between 50 000 g/mol and 150 000 g/mol and preferably between 50 000 g/mol and 100 000 g/mol. In particular, the film can comprise a blend of polyolefins which is at least partially crosslinked or else a copolymer based on polyethylene, in particular an ethylene/octene-polyethylene copolymer.

The film exhibits a thickness which is, for example, between 10 μm and 500 μm and more particularly between 50 μm and 200 μm.

The film can comprise a filler formed of particles of carbon black which makes it possible to confer on it a conductivity sufficient to prevent the accumulation of electrostatic charges.

The film can advantageously comprise particles and/or fibers formed of graphite or of molybdenum disulfide and/or comprising fluorine (in particular PTFE and/or FEP and/or PFA and/or PVDF), which makes it possible to enhance the sliding properties.

At least some particles and/or fibers are made of viscose and/or of polyamide, more particularly of aramid fibers, and/or of polyester and/or of polyimide and/or of polysulfone and/or of polyethersulfone and/or of polyetherimide and/or of polyoxymethylene and/or of a polyetherketone (PEK, PEKK, PEEK, and the like) and/or of acrylic fibers.

The particle size of the particles or the length L of the fibers can be between 15 μm and 200 μm, in particular between 30 μm and 100 μm and more particularly between 30 μm and 90 μm. The aspect ratio L/d of the length to the diameter of the fibers is between 1 and 100 and in particular between 1 and 50.

The invention also relates to a process for the manufacture of a belt as defined above, characterized in that it makes use of the application of a thermoplastic film as defined above, in the noncrosslinked or at least partially crosslinked state (for example with a degree of crosslinking of 20% or more), to a toothing rubber surface.

This application is advantageously carried out before formation of the toothing by molding in a Hydramold and vulcanization of the belt. During the vulcanization of the belt (at approximately 180° C.), a change in structure of the film is brought about which results in particular, in a first case, in partial crosslinking of the noncrosslinked film and, in a second case, in an increase in the degree of crosslinking of the partially crosslinked film, provided, however, that the film is crosslinkable during the vulcanization, which is carried out, for example, with peroxide.

In particular, cocrosslinking is capable of occurring between the film and the elastomer of the toothing of the belt (EPDM or EPM, in particular), with the advantage, inter alia, of very good adhesion of the film to the toothing of the belt.

BRIEF DESCRIPTION OF THE DRAWINGS

The invention will be better understood on reading the description in combination with the drawings, in which.

DETAILED DESCRIPTION

Figure 1:
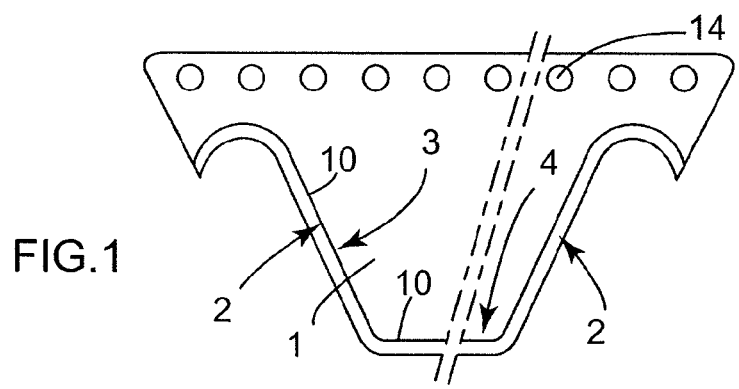
FIG. 1 illustrates a motor vehicle belt of K type according to the invention.

FIG. 1 illustrates a belt exhibiting one or more teeth 1 which are, for example, made of an elastomer of the family of the ethylene/α-olefins, for example of EPDM or of EPM, having sides 3 and a vertex 4. The reference point 10 denotes the surface of the teeth 1.

According to the present invention, a coating composed of a film 2 made of an at least partially crosslinked thermoplastic, comprising at least 30% of low-density polyethylene having a molecular weight of between 50 000 g/mol and 200 000 g/mol, more particularly between 50 000 g/mol and 150 000 g/mol and preferably between 50 000 g/mol and 100 000 g/mol, is provided at least on the surface 10 of the sides 3 of the teeth 1.

According to an example of a manufacturing process, a film of noncrosslinked or else at least partially crosslinked thermoplastic is positioned on the external face of the sheet in the raw state constituting the tooth rubber of the blank. It is preferable for the film not to be completely crosslinked in order to benefit from the improvement in the adhesion which is due to the chemical affinity between the film and the tooth rubber during the crosslinking.

The assembled product is placed in a Hydramold in order to bring about the indenting of the teeth and the vulcanization of the belt. After vulcanization, the film is partially or completely crosslinked and in particular it exhibits a degree of crosslinking between 50% and 100%, which is greater than that of the film positioned on the raw sheet 11 of tooth rubber.

After removing from the mold, the blank is cut up to form the individual belts. Noteworthy adhesion is found between the sheet of the at least partially crosslinked thermoplastic and the vulcanized tooth rubber.

The film of at least partially crosslinked thermoplastic is in particular a polyolefin or a blend of polyolefins which is at least partially crosslinked. The degree of crosslinking makes it possible to control the mechanical properties of the film and in particular to prevent its Young's modulus (which characterizes its stiffness) from being too high but also its heat resistance and its resistance to abrasion.

It is advantageous for the film to be a blend of polyolefins which comprises low-density polyethylene, for example between 50% and 90% of said polyethylene and more particularly between 80% and 90% of said polyethylene.

The polyethylene cocrosslinks with the EPDM or the EPM by virtue of the presence of peroxide or other crosslinking agent, and also optionally the matrix of the film, which creates an integral attachment with the ethylene/α-olefin of which the toothing of the belt is composed and promotes the adhesion of the film to the elastomer of the toothing. Moreover, the good compatibility of the polyethylene with the ethylene block present in the elastomer of the toothing (for example EPDM) improves the adhesion of the two layers.

Low-density polyethylene (up to approximately 0.94 g/cm$^3$) is chosen, which makes it possible to approach the mechanical properties of the rubber constituting the teeth of the belt.

Figure 3A:
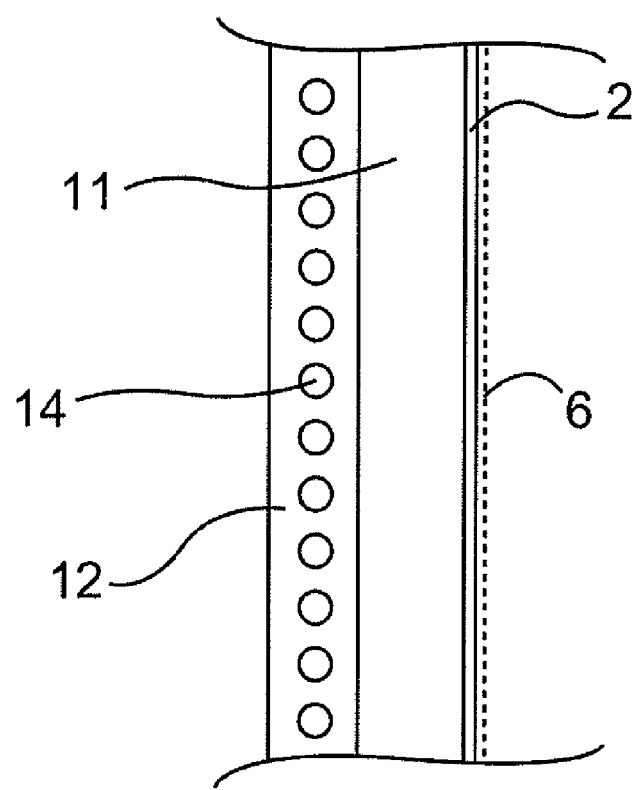
FIGS. 3a and 3b illustrate the process according to the invention.
Figure 3B:
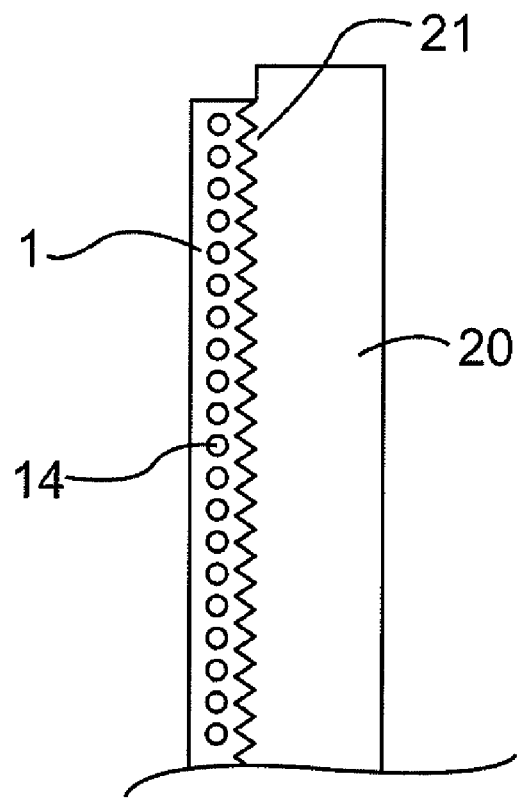

The film 2, when it is positioned on the raw sheet 11 of tooth rubber integral with the sheet 12 of back rubber, which exhibits a helically coiled reinforcing cord 14 (FIG. 3a), exhibits a thickness, for example, of between 10 μm and 500 μm and more particularly between 50 μm and 200 μm.

After passing into a Hydramold 20 exhibiting a toothing 21 and formation of the teeth 1 with vulcanization with the peroxide of the belt, the film partially or completely crosslinks and it is subjected to a mean drawing of the order of 100%, which means that its thickness lies between 5 μm and 250 μm and more particularly between 25 μm and 100 μm. A 100 μm film gives a coating of the teeth having a thickness of approximately 50 μm on the finished belt.

Figure 2A:
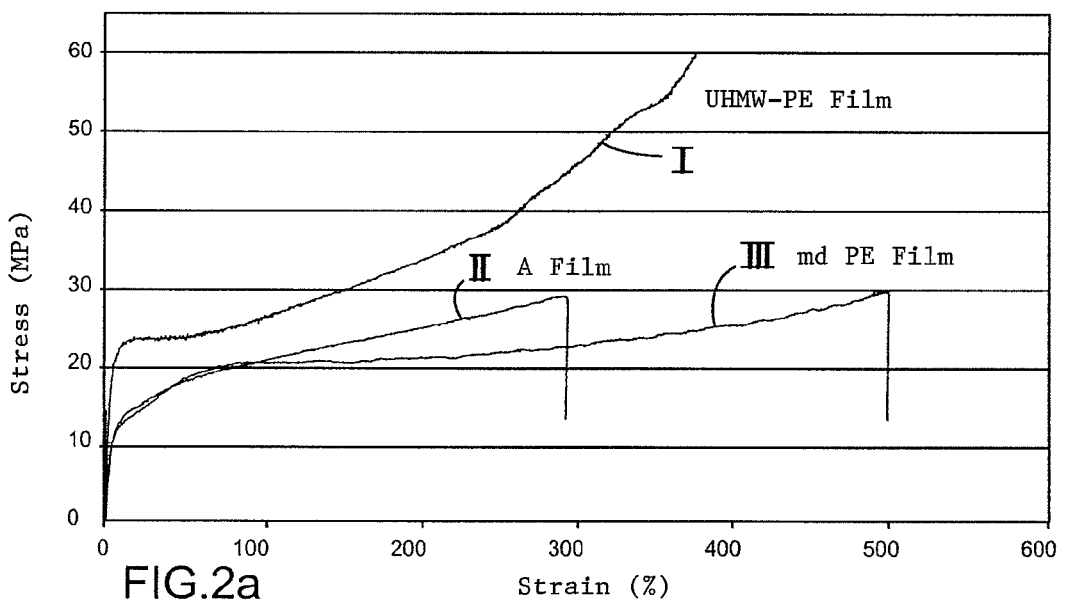
FIGS. 2a and 2b represent tensile tests respectively in the direction of extrusion, the "machine direction", (FIG. 2a) and in the cross direction perpendicular to the direction of extrusion (FIG. 2b) for three polyethylene-based thermoplastic films, respectively of ultra-high molecular weight polyethylene (UHMW-curve I), low-density polyethylene (curve II) and medium-density polyethylene (curve III)
Figure 2B:
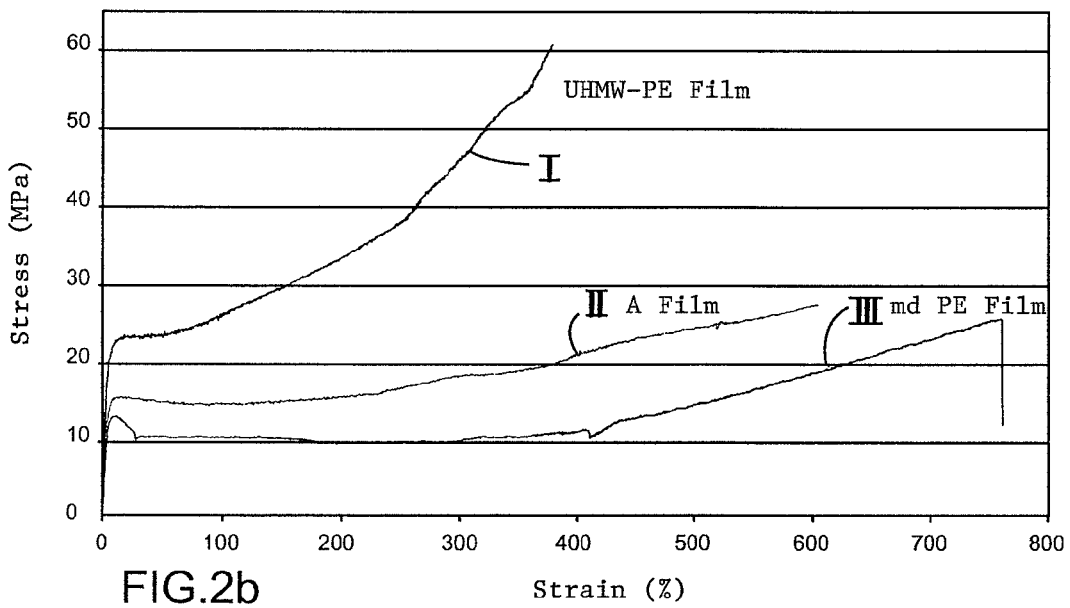

As is shown in FIGS. 2a and 2b, the film based on low-density polyethylene (curve II) does not exhibit a yield point in the machine direction. The presence of a yield point is reflected by a region of negative slope after the elbow in the curve. It exhibits a yield point in the direction perpendicular to the machine direction but this point is less pronounced than for the other two films.

In point of fact, during the stage of vulcanization of the belt, the properties of the film are modified, which results in the reduction in, indeed even the disappearance of, a yield point and in a reduction in the value of the modulus of the film (which becomes more flexible). The advantage of the process using a film based on low-density polyethylene is thus seen: eliminating the yield point in the cross direction where specifically the film is subjected to an elongation of 100% during the formation of teeth in the Hydramold.

The presence of this film, which coats the teeth of the vulcanized belt, makes it possible to reduce the phenomenon of noise and to retain this advantage over time as such an at least partially crosslinked (preferably between 50% and 100%) film exhibits very good resistance to wear by abrasion.

It is possible to add an additive, such as carbon black in the powder form, to the at least partially crosslinked thermoplastic film, which makes it possible to confer, on the surface of the belt, a conductivity sufficient to prevent the phenomena of accumulation of electrostatic charges.

The coefficient of sliding of the belt can also be improved by incorporating, in the film, particles and/or fibers of graphite or of molybdenum disulfide and/or particles or fibers (fluorofibers) comprising fluorine, such as PTFE (polytetrafluoroethylene) and/or FEP (fluorinated ethylene propylene) and/or PVDF (polyvinylidene fluoride) and/or PFA (perfluoroalkoxy) which is favorable to the reduction in the noise.

It is particularly advantageous to incorporate, in the film, particles and/or fibers made of polyester and/or of polyimide and/or of polyamide, preferably aramid fibers, and/or alternatively of viscose and/or of polysulfone (PSU) and/or of polyethersulfone (PES) and/or of polyetherimide (PEI) and/or of polyoxymethylene (POM) and/or alternatively acrylic fibers (PAN) and/or particles and/or fibers of the family of the polyetherketones. The family of the polyetherketones comprises in particular polyetheretherketone (PEEK), polyetherketoneketone (PEKK) and polyetherketone (PEK).

The incorporation of the particles and/or fibers within the film significantly improves the resistance to wear in comparison with a flocked conventional product, which exhibits fibers exposed directly to abrasion.

Particles and/or fibers can be incorporated during the manufacture of the film. Incorporation is preferably obtained by depositing the particles and/or fibers 6 at the surface of the film, for example by spraying, before the stage of vulcanization in the Hydramold 20. During the vulcanization of the belt, the film 2 is heated and is distorted to form the teeth, and the particles and/or fibers 6 are incorporated in the body of the film 20 without protruding to the outside of the belt.

The at least partially crosslinked thermoplastic film generally exhibits good properties in the presence of hydrocarbons.

Crosslinkable thermoplastic resins comprise one or more polymers, such as polyolefins, polystyrenes, polyurethanes, polyamides and polyesters.

For a belt made of EPDM or of EPM, it is particularly advantageous to use a crosslinked film made of a polyolefin comprising a homo- or a copolymer comprising ethylene. The ethylene copolymers comprise in particular ethylene/α-olefin (EAO) copolymers, ethylene/unsaturated ester copolymers, ethylene/acrylate/acrylic acid copolymers, ethylene/methacrylic acid copolymers and polyethylene-ethylene/octene copolymers. It should be noted that the term "copolymer" covers polymers resulting from two or more types of monomers and thus includes terpolymers.

There exist different crosslinking processes which can be used for the film:

1) Chemical crosslinking, which employs one or more crosslinking agents (peroxide, silane, and the like) and exposure to at least one activation condition (heat, pressure and/or radiation).

Chemical crosslinking is, for example, carried out using peroxide, between 110° C. and 220° C., in particular for polyethylene and TPE, such as SBS or SIS, or alternatively for chlorinated polyethylene (CM or CPE) or chlorosulfonated polyethylene (CSM).

In order to increase the degree of crosslinking, it is possible to add, to the blend used for the film, crosslinking coagents comprising in particular acrylate (difunctional acrylate DA, trifunctional acrylate TA), methacrylate (difunctional methacrylate DMA or trifunctional methacrylate TMA, trimethylolpropane trimethacrylate TMPTMA) or cyanurate (triallyl isocyanurate TAIC) groups or alternatively PB (1,2-vinylpolybutadiene) or mPDM (N,N'-m-phenylene-dimaleimide).

2) Crosslinking by irradiation (electron beam, X-rays, γ- or β-rays), which may or may not employ crosslinking coagents. For the electrons, the energy is preferably at least equal to $10^4$ eV.

For crosslinking by irradiation, use is made, for example, of a dose between 10 kGray and 300 kGray at a temperature between 0° C. and 60° C. and preferably at ambient temperature (20° C.).

The degree of crosslinking can be determined in particular by measuring the gel content, for example according to the standard ASTM D 2765-95.

Another test for determining the gel content (in %) consists in dissolving the noncrosslinked fraction in a solvent which does not dissolve the crosslinked fraction (gel) of the resin. The percentage obtained is the fraction of the insoluble (crosslinked) phase with respect to the total weight of the resin.

Another method is to determine the melt flow index according to the standard ASTM D 1238-98.

Comparative Tests

| Test type (Standard) | Conditions | Characteristic measured | Flocked standard EPDM belt | Belt with UHMW PE film | Belt with PE film according to the invention |
|---|---|---|---|---|---|
| Diesel engine | 4 Cyl. diesel engine, accessories in operation, idling | Cracking lifetime (h) | 800 | 65 | 1200 |
| Heat resistance (SAE J2432A) | 121° C./ 20 Sm/K6 | Lifetime (h) | 600 | 910 | 920 |
| Noise qualification (SAE J2432A) | 25° C./50% RH | Angle (°) of appearance of the noisiness | ±2 | ±4.5 | ±4.5 |

The EPDM belt with PE film according to the invention tested comprises a polyethylene-ethylene/octene copolymer plastomer film which is a blend of low-density polyethylene and of linear low-density polyethylene.

The angle measured according to SAE J2432A is a misalignment angle expressed in °. This is the angle which has as tangent the ratio of the axial misalignment a (in mm) between pulleys to the length L of the nonmisaligned span. Angle=Arctg (a/L).

The test consists in applying an axial misalignment and listening from what misalignment the noisiness appears. The greater the angle, the better the result.

EXAMPLE nonmisaligned span length L between two test pulleys: 80 mm; axial misalignment (a) brought about in order to obtain the appearance of the noisiness=6.3 mm;

Angle=Arctg(6.3/80)=4.5°.

What is claimed is:

1. A V-ribbed power transmission belt exhibiting a toothing made of elastomer based on ethylene/α-olefin elastomer, wherein the toothing comprises a plurality of longitudinal V-shaped teeth each having a pair of converging sides and a vertex disposed therebetween, and wherein the converging sides of the toothing are coated with an antifriction film made of at least partially crosslinked thermoplastic comprising at least 30% of at least one low-density polyethylene having a molecular weight of between 50 000 and 200 000 g/mol, said film having an internal face coating the surface of the converging sides of the toothing and an external face defining an external surface of the coated belt, wherein said at least one low-density polyethylene is incorporated in a blend of polyolefins comprising said low-density polyethylene or in a copolymer based on said low-density polyethylene.

2. The belt as claimed in claim 1, wherein said low-density polyethylene has a molecular weight of between 50 000 and 150 000 g/mol.

3. The belt as claimed in claim 1 wherein the degree of crosslinking of the thermoplastic is between 50% and 100%.

4. The belt as claimed in claim 1, wherein said film comprises between 30% and 90% of said low-density polyethylene.

5. The belt as claimed in claim 4, wherein said film comprises between 75% and 90% of said low-density polyethylene.

6. The belt as claimed in claim 1, wherein said ethylene/α-olefin elastomer is an EPDM or an EPM.

7. The belt as claimed in claim 1, wherein the film exhibits a thickness of between 10 μm and 500 μm.

8. The belt as claimed in claim 1, wherein said film comprises a filler formed of particles of carbon black.

9. The belt as claimed in claim 1, additionally comprising particles and/or fibers which are embedded in said film, wherein the particles have a particle size and/or the fibers have a length of between 15 μm and 200 μm, and wherein the fibers have an aspect ratio between 1 and 100.

10. The belt as claimed in claim 1, additionally comprising particles and/or fibers which are embedded in said film, wherein at least some particles and/or fibers are made of graphite and/or of molybdenum disulfide and/or of PTFE and/or FEP and/or PFA and/or PVDF.

11. The belt as claimed in claim 1, additionally comprising particles and/or fibers which are embedded in said film, wherein at least some particles and/or fibers are made of viscose and/or of polyamide, and/or of polyester and/or of polyimide and/or of polysulfone and/or of polyethersulfone and/or of polyetherimide and/or of polyoxymethylene and/or a polyetherketone and/or of acrylic fibers.

12. A process for the manufacture of a ribbed power transmission belt having toothing made of elastomer based on ethylene/α-olefin elastomer, wherein the toothing comprises a plurality of longitudinal V-shaped teeth each having a pair of converging sides and a vertex disposed therebetween, said process comprising applying in the noncrosslinked or at least partially crosslinked state, to surfaces of said converging sides made of toothing rubber an antifriction thermoplastic film comprising at least 30% of at least one low-density polyethylene having a molecular weight of between 50 000 and 200 000 g/mol, the film having an internal face coating the surface of the converging sides of the toothing and an external face defining an external surface of the coated belt, wherein the at least one low-density polyethylene is incorporated in a blend of polyolefins comprising the low-density polyethylene or in a copolymer based on the low-density polyethylene.

13. The process as claimed in claim 12, wherein the applying step is carried out on the toothing rubber in the raw state, before formation of the toothing by molding and vulcanization of the belt.

14. The process as claimed in claim 13, including incorporating particles and/or fibers in said film in the noncrosslinked or at least partially crosslinked state.

15. The process as claimed in claim 13, including depositing particles and/or fibers at the surface of the film in the noncrosslinked or at least partially crosslinked state which are incorporated in the film during the vulcanization of the belt.

16. The process as claimed in claim 14, wherein at least some particles and/or fibers are made of graphite and/or of molybdenum disulfide and/or of PTFE and/or FEP and/or PVDF.

17. The process as claimed in claim 14, wherein at least some particles and/or fibers are made of polyester and/or of polyimide and/or of polyamide, and/or of viscose and/or of polysulfone and/or of polyethersulfone and/or of polyetherimide and/or of polyoxymethylene and/or a polyetherketone and/or of acrylic fibers.

18. The process as claimed in claim 13, wherein the thermoplastic film is extruded and has a direction of extrusion, and a cross direction perpendicular to the direction of extrusion, and wherein during said formation of the toothing, said film is elongated in said cross direction.

* * * * *